United States Patent [19]

O'Brien et al.

[11] Patent Number: 4,885,763
[45] Date of Patent: Dec. 5, 1989

[54] VOICE MAIL SYSTEM WITH IMPROVED DETECTION AND CANCELLATION

[75] Inventors: Dennis J. O'Brien, West Linn; Paul G. Hanson, Portland; Thomas D. Klarquist, Beaverton; Bruce C. Nepple; Michael C. Park, both of Portland; Robin R. Rosas, Beaverton, all of Oreg.

[73] Assignee: AT&E Corporation, San Francisco, Calif.

[21] Appl. No.: 127,338

[22] Filed: Dec. 1, 1987

[51] Int. Cl.⁴ .............................................. H04M 1/65
[52] U.S. Cl. ........................................ 379/67; 379/77; 379/351; 379/386
[58] Field of Search .................. 379/77, 67, 88, 89, 379/351, 386

[56] References Cited

U.S. PATENT DOCUMENTS

| | | | |
|---|---|---|---|
| 3,106,612 | 10/1963 | Lemelson | 379/73 |
| 3,436,483 | 4/1969 | Blane | 379/75 |
| 3,488,443 | 1/1970 | Smith | 379/71 |
| 3,530,260 | 9/1970 | Gaunt, Jr. | 379/405 |
| 3,595,999 | 7/1971 | Cole | 379/69 |
| 3,714,382 | 1/1973 | Sykes | 360/72.2 |
| 3,715,518 | 2/1973 | Campbell et al. | 379/105 |
| 3,728,487 | 4/1973 | Hata | 379/82 |
| 3,804,993 | 4/1974 | Honnold et al. | 379/73 X |
| 3,812,532 | 5/1974 | Crosser et al. | 360/72.2 |
| 3,858,006 | 12/1974 | Tomita | 379/73 |
| 3,865,987 | 2/1975 | Yamamoto et al. | 379/73 |
| 3,967,068 | 6/1976 | Shinohara | 379/73 |
| 4,006,312 | 1/1977 | Rubenstein et al. | 379/73 |
| 4,011,411 | 3/1977 | Nishimura | 379/73 |
| 4,074,071 | 2/1978 | Shragal | 379/73 |
| 4,122,306 | 10/1978 | Friedman et al. | 379/73 |
| 4,124,773 | 11/1978 | Elkins | 379/101 |
| 4,125,865 | 11/1978 | Mohammadioun | 360/32 |
| 4,194,089 | 3/1980 | Hashimoto | 379/76 |
| 4,198,544 | 4/1980 | Buglewicz | 379/73 |
| 4,247,876 | 1/1981 | Bolick, Jr. | 360/92 |
| 4,249,041 | 2/1981 | Smith, Jr. et al. | 369/28 |
| 4,303,998 | 12/1981 | Plunkett, Jr. | 379/75 X |
| 4,312,021 | 1/1982 | Bolick, Jr. | 360/132 |
| 4,319,290 | 3/1982 | Bolick, Jr. et al. | 360/92 |
| 4,320,256 | 3/1982 | Freeman | 379/73 |
| 4,327,251 | 4/1982 | Fomenko et al. | 379/76 X |
| 4,352,956 | 10/1982 | Gallet | 379/71 |
| 4,371,752 | 2/1983 | Matthews et al. | 379/89 |
| 4,398,279 | 8/1983 | Titus, IV et al. | 369/58 |
| 4,431,872 | 2/1984 | Edwards et al. | 379/351 |
| 4,473,854 | 9/1984 | Oishi et al. | 360/72.2 |
| 4,517,410 | 5/1985 | Williams et al. | 379/73 |
| 4,521,647 | 6/1985 | Olson et al. | 379/351 |
| 4,571,457 | 2/1986 | Hattori et al. | 379/56 |
| 4,580,012 | 4/1986 | Matthews et al. | 379/245 |
| 4,580,016 | 4/1986 | Williamson | 379/31 |
| 4,581,486 | 4/1986 | Matthews et al. | 379/88 |
| 4,585,906 | 4/1986 | Matthews et al. | 379/88 |
| 4,602,129 | 7/1986 | Matthews et al. | 379/88 |
| 4,640,990 | 2/1987 | Kawade et al. | 379/77 |
| 4,640,991 | 2/1987 | Matthews et al. | 379/88 |
| 4,663,675 | 5/1987 | Jones, Jr. et al. | 360/32 |
| 4,700,376 | 10/1987 | Ohya et al. | 379/77 |

*Primary Examiner*—Thomas W. Brown
*Attorney, Agent, or Firm*—Klarquist, Sparkman, Campbell, Leigh & Whinston

[57] ABSTRACT

A voice mail system includes method and apparatus for muting a previously recorded audio signal upon detection of a DTMF signal to differentiate between recorded DTMF signals and valid DTMF commands. A DTMF signal detected after muting is recognized as an invalid command.

1 Claim, 9 Drawing Sheets

VOICE MAIL SYSTEM WITH IMPROVED DETECTION AND CANCELLATION

BACKGROUND OF THE INVENTION

This invention generally relates to voice mail systems and more particularly to system improvements in detection of messages and valid DTMF signals or tones and in cancellation of a previously recorded audio message from a message to be recorded.

As explained in depth in other patents such as U.S. Pat. No. 4,371,752 to Matthews and U.S. Pat. No. 4,747,126 to Hood et al. owned by the present assignee, a voice mail system records and plays back telephone messages intended for one of a plurality of system users. The caller is typically greeted and instructed by prompt signals, to which he responds by entering touch tone (DTMF) commands. The caller can thereby record a message, review it, or perform other system operations. The user similarly can use DTMF commands for system control, such as to retrieve or delete messages for him.

A recurring problem in voice mail systems is triggering of the system by noncommand or invalid DTMF signals. These signals can occur both in a message received for recording, as a result of a caller's voice, and in the playback of a previously recorded message, as a result of voice or a DTMF command entered by the caller. A tone detector within the system is adapted to respond to DTMF commands during both record and playback and may inadvertently respond to an invalid signal.

Prior attempts to solve the playback problem have only been partially effective. The method described in U.S. Pat. No. 4,747,126 limits recorded tones to a duration shorter than is required for the tone detector on playback to respond. But these and other methods do not effectively handle DTMF signals produced on playback by the caller's voice, a voice prompt in the system, signal noise, etc., that contain the same tones as DTMF signals.

Another problem present in prior voice mail systems is line interference with the caller-generated DTMF commands. Different telephone systems have different impedances in their central office lines which affect the transmission and echoing of audio signals to a voice mail system. Matching the impedance of all possible systems to the voice mail system is not practical. Prior voice mail systems have generally incorporated a single characteristic impedance that will work passively with whatever telephone system is ultimately connected to the mail system. However, telephone lines that differ in impedance from the characteristic impedance can interfere with valid DTMF tone commands generated by the caller, causing the voice mail system to ignore the command in the presence of a voice prompt or other previously recorded audio message. For example, the system may not hang up because a DTMF command indicating the end of a message was obscured. Poor matching of the telephone system and voice mail system impedance can also affect the ability of the voice mail system to cancel a previously recorded message from a message to be recorded.

Yet another problem found in prior voice mail systems is their inability to hang up once a caller has finished his message. Most systems ask the caller for a DTMF command to indicate the message has ended and that the system may hang up. Many callers fail to enter that command. Moreover, the command may not successfully pass through the interference described above. Other systems include an audio detection circuit as a backup detection, causing the system to hang up after a predetermined length of silence. But noise or central office generated call progress tones can often produce sufficient audio energy to fool the audio detection circuit. A fail-safe method is sometimes employed, such as terminating the call after a predetermined time unless the caller takes further action such as pressing a telephone key. Fail-safe methods are effective but annoying to a caller and inefficient because it wastes limited system storage.

Prior systems also include means for indicating to each user at his telephone the status of the system and whether he has a message waiting. A drawback of such indicators is that they are limited to the telephone location and do not reach the person who is frequently out of his office in a laboratory or common work area.

SUMMARY OF THE INVENTION

An object of the invention, therefore, is to provide an improved voice mail system.

Another object of the invention is to improve the ability of a voice mail system to differentiate on playback between valid DTMF commands entered by the user and previously recorded DTMF signals in the message.

The foregoing and other objects, features, and advantages of the invention will become more apparent from the following detailed description of a preferred embodiment which proceeds with reference to the accompanying drawings.

DETAILED DESCRIPTION

System Overview

Figure 1:
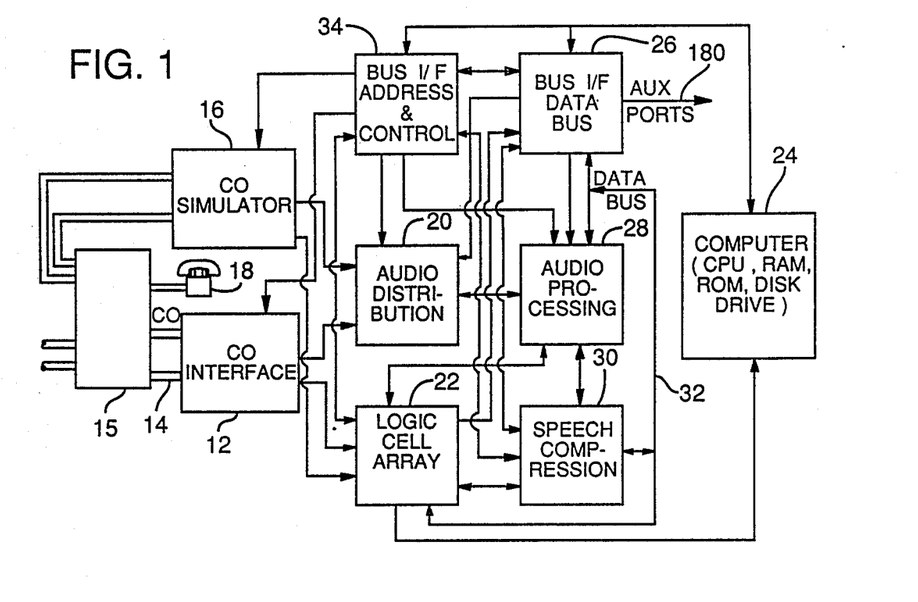
FIG. 1 is a block diagram of a voice mail system according to the invention.

With reference now to the drawings, FIG. 1 is a block diagram of one embodiment of a voice mail system 10 according to the invention. The system shown is a disk-based digital voice mail system. It should be understood, however, that the invention as described and claimed herein is not limited to disk-based systems and can be applied to magnetic tape-based and other voice mail systems as well. Several features of this embodiment are adequately explained in our U.S. Pat. Ser. No. 4,747,126 which is incorporated herein by reference. The common features will be described with reference to that application.

At the left of FIG. 1, a CO interface 12 is shown that interfaces the voice mail system 10 with one or more telephone lines 14 to a central telephone office. Lines 14 from the interface 12 may connect directly to a central office or, more likely, connect to a PBX, EKTS, or other system 15 that handles communication between the central office and internal lines of a business. Shown immediately above interface 12 is a CO simulator 16 that provides an interface to the system 10 for one or more telephone lines 18 or other devices connected to the system 15. Simulator 16, in effect, mimics an outside telephone line so that internal access may be provided to the voice mail system without requiring the local user to dial out and tie up an outside line.

The interface 12 and simulator 16 each provide two output signals: an incoming audio signal that is routed to an audio distribution circuit 20 and a ring detect/off hook detect signal that is routed to a logic cell array 22. In the present embodiment, interface 12 and simulator 16 each have two audio signal paths so that a total of four audio paths connect to the audio distribution circuit 20. The number of signal paths may be increased as desired. The circuit 20 is a switching point for connecting up to two active audio paths, i.e., a path with an incoming audio signal present, to the rest of the system 10. Similarly, four detect signal paths connect to array 22, which is a software, programmable logic cell array such as a XILINX LCA 2064 that comprises system interrupt and status registers for computer 24. A detect signal on one of the signal paths alerts the computer 24 via array 22 that an audio signal is present on the corresponding audio path to circuit 20. The computer 24, in turn, communicates with the audio distribution circuit 20 via a data bus interface 26 to select the active audio path. The elements of the computer 24 are conventional and may include a microprocessor such as an 8088, random access memory (RAM), read only memory (ROM), and a disk drive for digital data storage of messages, voice prompts, test information, and other information for a caller or user.

The audio distribution circuit 20 transmits received audio signals via one of the audio channels to an audio processing circuit 28. Voice messages, DTMF signals, and call progress tones such as a busy signal and a dial tone can be detected by this circuit. As described in U.S. Pat. No. 4,747,126 the DTMF signals are decoded for system control purposes such as recording and playing back a message. The audio processing circuit 28 also includes means for converting the analog audio signal into a digital signal for storage as data on a disk and for reconverting a stored digital signal into an analog signal for transmission to a caller. To reduce the disk space required for data storage, the digital audio signals are compressed via a conventional speech compression circuit 30 before transfer via a data bus 32 and interface 26 to disk storage in the computer 24.

Previously recorded audio signals read from the disk include voice prompts as well as audio messages and test information. A previously recorded signal is reconverted from a digital to audio signal by the processing circuit 28 and sent to the audio distribution circuit 20. There, the previously recorded audio signal is combined with a received audio signal via a 2-to-4 wire converter so that the caller can hear a previously recorded message and respond by DTMF commands. The 2-to-4 wire converter ideally cancels the previously recorded audio signal so that the converted output is just the received audio signal, communicated to the audio processing circuit 28 for recording as a new message. In system 10, as other voice mail systems, the caller can end the message by entering a DTMF command.

Each of the above-described circuits of the system 10 are controlled by the computer 24 through a conventional bus interface address and control circuit 34. The control circuit 34 communicates computer commands directly to the affected circuit. For some of these circuits, such as the data bus 26, the responses are relayed back to the computer 24 by the control circuit 34. For other circuits, such as CO simulator 16 or CO interface 12, communication with the computer 24 is effected via array 22 or data bus 26. Communications among the circuits and the computer 24 which are relevant to the present invention are described in more detail in the following section. For a more complete description of the data bus interface and data bus requirements, reference should be made to the manufacturer's specification sheet for the selected microprocessor.

Circuit Description

Figure 2:
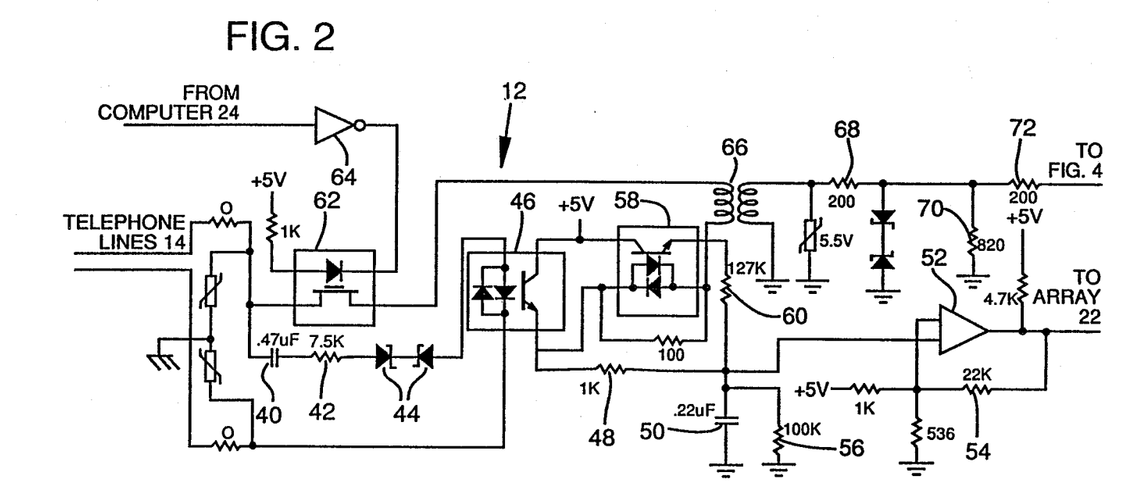
FIG. 2 is a schematic diagram of the CO interface circuit in FIG. 1.

Referring now to FIG. 2, a schematic view of the CO interface 12 is shown. Two identical interfaces are illustrated for accepting two calls concurrently. Ring level is detected by the cooperation of DC blocking capacitor 40, current limiting resistor 42, and ring level threshold diodes 44. If the AC ring voltage exceeds the threshold set by diodes 44, current flows through the opto-isolator 46. The output transistor of opto-isolator 46 switches on, causing a voltage to be applied across the resistor 48 and capacitor 50, which are coupled to the inverting input of a ring loop comparator 52. Capacitor 50 charges until it reaches the threshold voltage on the comparator's noninverting input and causes the comparator to change state and assert the detect signal, active low. A resistor 54 provides positive feedback to the noninverting input for sharp state transitions. When the ringing ceases, opto-isolator 46 switches off and capacitor 50 discharges to resistor 56 to remove the detect signal. Resistor 48 and resistor 56 are chosen so that the delay before asserting the detect signal is shorter than the delay in removing the ringing signal. As described, the detect signal is passed to the array 22 to communicate the presence of a call to the computer 24.

Loop current is detected through an opto-isolator 58. Detection is similar to that for ring voltage, except that the voltage for recharging capacitor 50 is applied across a resistor 60 of much greater resistance than resistor 48. Consequently, the applied voltage divides more substantially across resistors 56 and 60 to increase the delay in asserting the detect signal and decrease the ultimate voltage on the capacitor. When the ringing ceases, less time is thus required to lower the capacitor voltage to below threshold and remove the detect signal.

The off hook switching function for answering a ring and hanging up is carried out by the computer 24 via signals from the control circuit 34 through an optically isolated MOS switch 62. If ringing is detected, the off hook signal is asserted as the input to an inverter 64.

The inverter output goes low, allowing the switch 62 to conduct the incoming audio signal into the circuit 12. The resulting signal current switches on opto-isolator 58 as the audio signal is transmitted across an isolation transformer 66 to an impedance matching pad comprising resistors 68, 70, 72 coupled to the transformer's secondary winding. The impedance pad reduces the range of impedance values seen by the 2-to-4 wire converter within the audio distribution circuit 20 to improve the signal's transfer.

Figure 3:
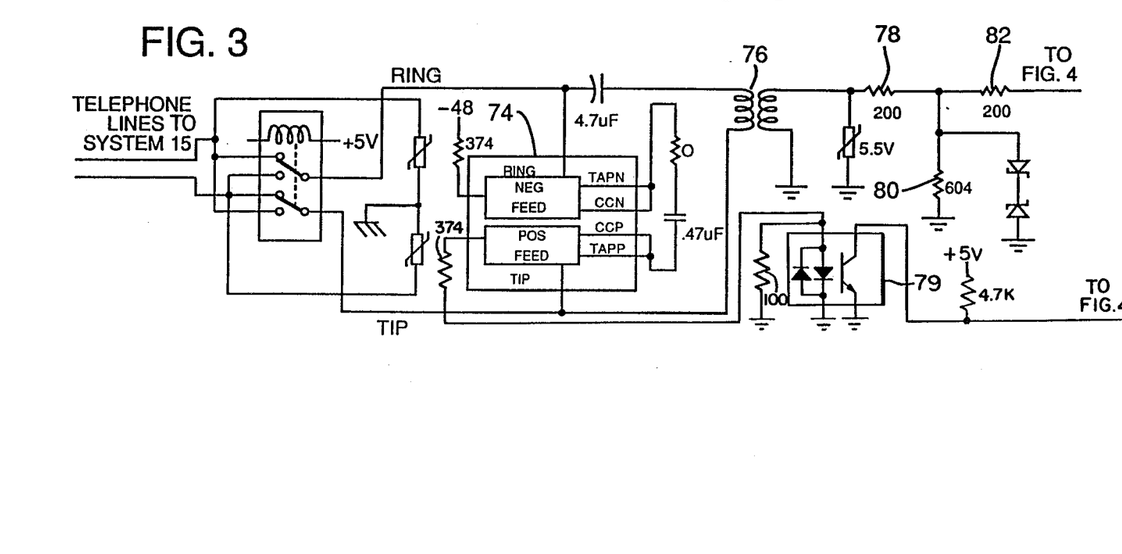
FIG. 3 is a schematic diagram of the CO simulator circuit in FIG. 1.

FIG. 3 is a schematic view of the CO simulator 16. In order to simulate an outside line, simulator 16 includes a −48 voltage source applied across an isolation circuit 74 that simulates a large inductor and isolates a −48 V voltage source from the rest of system 10. Isolation circuit 74 allows for DC current flow without affecting the AC impedance at audio frequencies. The audio signal, powered by the −48 voltage source, is transmitted across a transformer 76 to an impedance matching pad comprising resistors 78, 80, and 82. This impedance pad, similar to the pad in circuit 12, is coupled to the secondary winding of transformer 76 to reduce the impedance range seen by the 2-to-4. wire converter in the distribution circuit 20.

Current produced by an incoming call is detected by an opto-isolator 79 coupled to circuit 74. The detect signal at the output transistor of opto-isolator 79 is asserted low and routed to an array 22 for communication to the computer 24.

Figure 4:
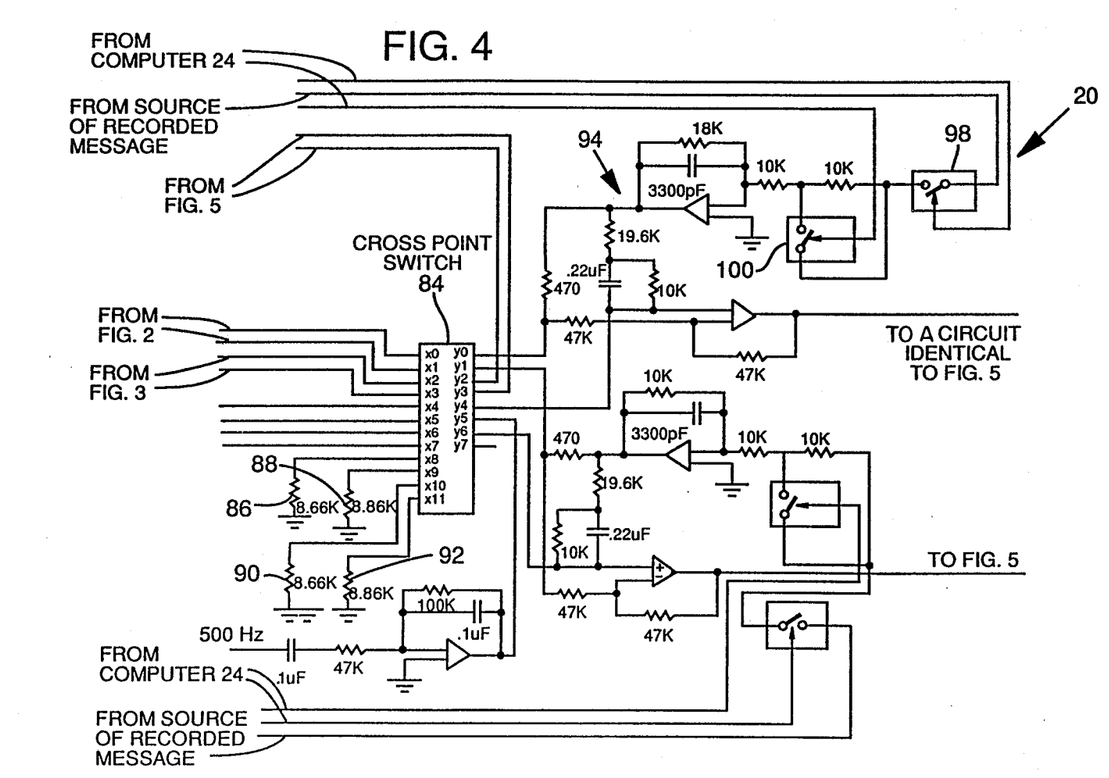
FIG. 4 is a schematic diagram of the audio distribution circuit in FIG. 1.

Received audio signals are transmitted along signal paths from circuits 12 and 16 to distribution circuit 20 as shown in FIG. 4. At the left of the figure, these signal paths encounter a cross point switch 84 such as a Silicon Systems SSI 78093A/B that connects any I/O point on its left side to any I/O point on its right side. Connection of the left and right side points is controlled by computer 24 through a conventional address register in the data bus 26. As explained in the specification for the SSI 78093A/B, the connection is made by the computer 24 by loading the appropriate address into the register and then strobing the switch 84 to latch the address therein. Of the left side inputs include four cancellation networks 86, 88, 90, and 92 covering a range of impedances. Coupled to the I/O points on the right side of switch 84 are a 2-to-4 wire converter 94 and a dialer signal path for each of the two audio channels. Also coupled thereto is a 500 hertz tone for a busy signal that appears on an audio signal path when both audio channels are in use. The dialer signal is generated by the system 10 to connect the caller with the receptionist and take the caller out of the voice mail system. It should be noted that expansion audio signal paths are also connectable to the left side of the switch 84 if additional circuits 12 and 16 are added to the system 10.

The switch 84 then has three functions. One function is to provide means for routing active signal paths from the interface circuit 12 and simulator circuit 16 to the two audio channels at the output of distribution circuit 20. This means comprises computer 24 communicating with the switch 84 to make connections in response to detection of active audio signal paths in circuits 12 and 16. A second function is to provide means for passing DTMF signals from the dialer signal path and the busy signal from the 500 hertz tone to the audio signal paths. Again, this means comprises computer 24 communicating with the switch 84 to make these connections in response to active paths in circuits 12 and 16. The third function is to provide means for matching the impedance of the central office lines by switching cancellation networks 86, 88, 90, and 92 into and out of the 2-to-4 wire converter 94 to improve its cancellation ability. The means for matching the impedance will be described hereinafter.

As mentioned in the background of this invention, one problem with prior voice messaging systems has been the inability to differentiate between previously recorded DTMF signals produced by a previously recorded message and valid DTMF commands generated by the user. Ideally, the 2-to-4 wire converter should eliminate the previously recorded audio signal from the audio signal detected by the tone detector. However, this often is not the case. In the present embodiment, the potential for the problem can be seen with reference to FIGS. 4 and 5, which have a DTMF transceiver 96 such as a MITEL MT 8880 that detects and transmits DTMF signals. The operation of the transceiver is more fully discussed hereinafter, but for the present it should be understood that signals generated by the DTMF transceiver 96 and transmitted via data bus 32 will cause the computer 24 to respond as the command requires. Such responses may include erasing the message, jumping over the message, etc. To improve the differentiation, means are provided for muting the previously recorded signal so that computer 24 does not respond to the signal as a command. An element of that means is an interrupt request IRQ signal generated by transceiver 96. The IRQ signal is sent to the computer 24 via the array 22 whenever a DTMF signal is detected for a predetermined time in the received audio signal from the distribution circuit 20. This time is chosen to be sufficiently long so that a transient does not prompt an IRQ signal in response but is short enough that a valid DTMF tone produced by a key would not go undetected. A second element of the means is an analog mute switch 98 through which the transmitted audio signal passes before crossing the signal level switch 100 and appearing at the 2-to-4 wire converter 94. The switch 98 is controlled by a mute signal generated by a third element of the means, the computer 24. The mute signal is triggered by the computer in response to the IRQ signal from the transceiver 96.

Figure 6:
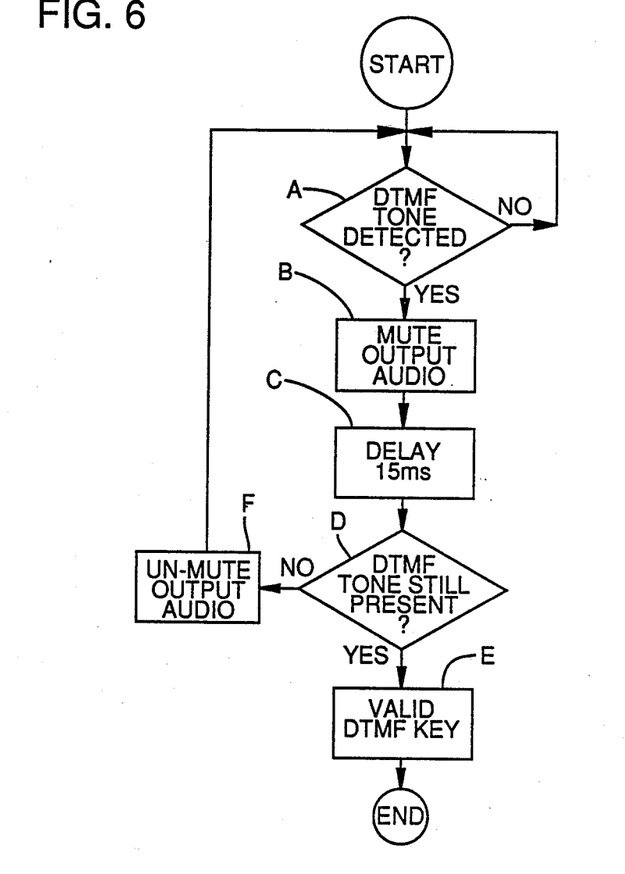
FIG. 6 is a flowchart of a method of differentiating between previously recorded DTMF signals and valid DTMF commands.

FIG. 6 is a flowchart of the computer's response to a detected DTMF signal of sufficient length to prompt an IRQ signal from the transceiver 96. Whenever a tone is detected by the computer via the IRQ signal (step A), the mute signal is asserted (step B) to open the mute switch 98 so that the transceiver is no longer receiving the previously recorded audio signal. A 45 millisecond delay is counted out (step C) so that the tone within the transceiver may dissipate. With the mute switch 98 still open, the computer again checks for a DTMF signal (step D). If it is still present, then the computer recognizes the tone as valid (step E) because the previously recorded audio signal is not present to produce the DTMF signal. Hence, the DTMF signal must be in the received audio signal, generated by the user. If the DTMF signal is absent, the computer 24 recognizes the source of the signal as a previously recorded audio signal, ignores it as invalid, and closes the switch 98 (step F). The computer's response then reverts to step A until another DTMF signal is then detected.

Figure 7:
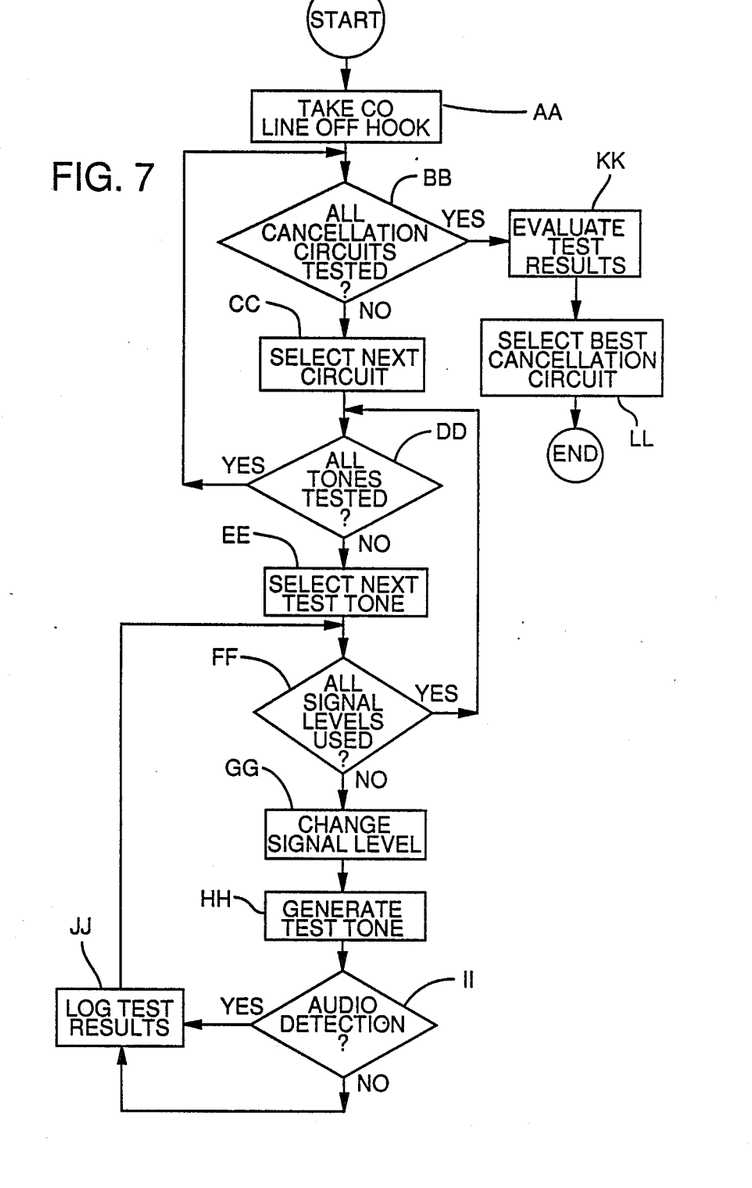
FIG. 7 is a flowchart of a method of matching the voice mail system input impedance to the impedance of the connected telephone system.

Referring now to the cross points switch 84 and cancellation networks 86–92, these components comprise a means for compensating for a mismatch of impedances between the 2-to-4 wire converter 94 and the outside telephone system represented by the connected telephone lines 14. As described heretofore, this mismatch hinders the effectiveness of the converter 94 in cancelling previously recorded audio signals that interfere with valid DTMF commands from the user and call progress tones. To optimize cancellation, the four cancellation networks 86-92 (which preferably cover a preselected range of impedance) are inserted into the converter circuit to test it over a range and strength of DTMF signal and other tones. The flowchart of FIG. 7 illustrates the means and method. On power up of system 10, the computer 24 takes a central office line connected to interface 12 off hook to generate a dial tone as the received audio signal (step AA). The computer then checks its memory to see if all cancellation networks have been tested (step BB). With the method just underway, each network is to be tested and the computer selects a first network (step CC). If all tones have not been tested against a selected network (step DD), then a test tone is selected from memory to be generated as a previously recorded audio signal (step EE). Each tone is applied at a number of amplitudes (step FF, GG, HH). Whether an audio signal apart from the dial tone is detected is then logged (step II, JJ). All test tones are applied at their different amplitudes to each of the four cancellation networks, and the logged results evaluated for the lowest aggregate audio interference detected (step KK). The optimum cancellation network is then selected by the computer 24 and connected to the converter 94 via the cross point switch 84 (step LL).

With reference again to FIG. 5, it can be seen that the audio processing circuit 28 comprises other components in addition to the DTMF transceiver 96. The components include a call progress detector 102, an audio detection circuit 104, an AGC amplifier 106, and a bidirectional PCM coder decoder (CODEC) 108.

Figure 5:
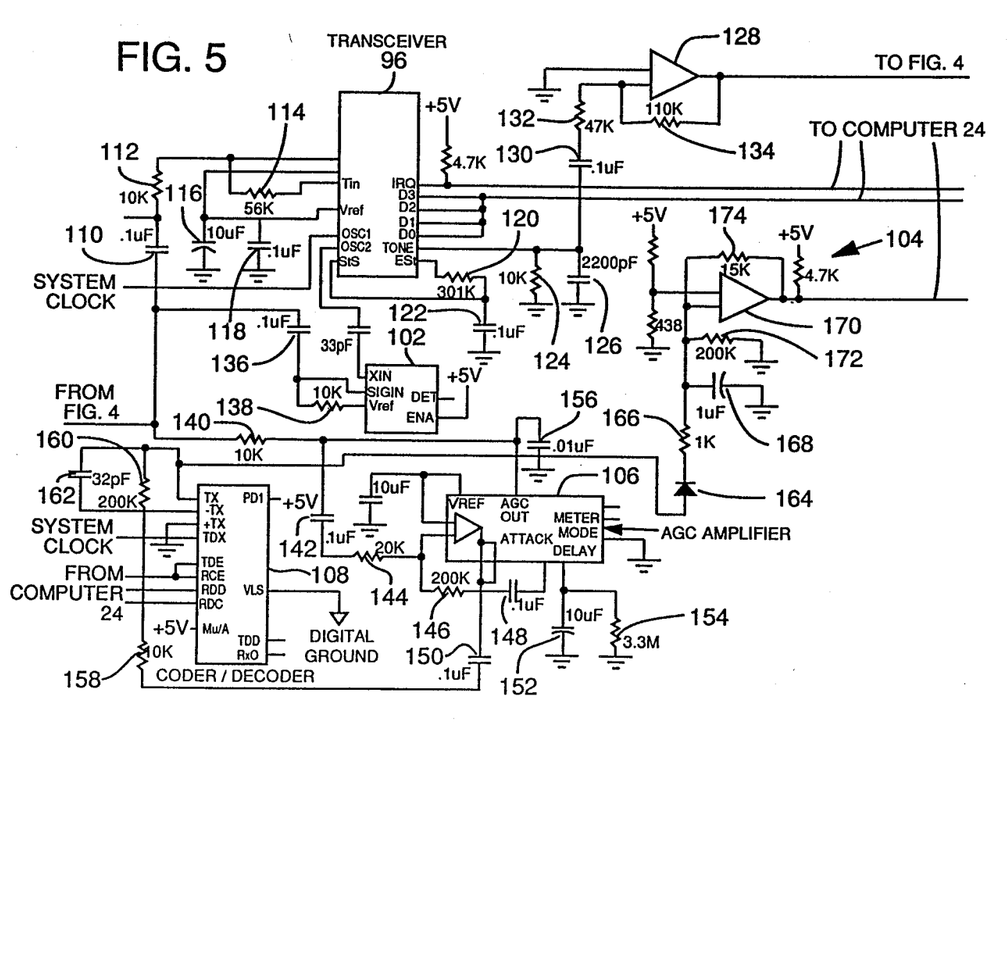
FIG. 5 is a schematic diagram of the audit processing circuit in FIG. 1.

Transceiver 96 itself requires an input gain stage to compensate for signal losses in circuits 12 and 16 and in the matching pads. This stage also is configured to shift the DC bias point from zero volts provided by the converter 94 to 2.5 volts required by the transceiver 96. This stage includes an internal operational amplifier with inputs IN− and IN+ and Tin as the output, with the amplifier internally connected to tone detectors. The capacitor 110 is required to block DC to the amplifier inputs. A resistor 112 is an input resistor to the amplifier, with resistor 114 of a greater value selected as a feedback resistor for gain. DC bias for the amplifier is set by Vref on the transceiver. Capacitors 116 and 118 act to filter high frequency noise that may be present at Vref.

On the right side of the transceiver 96 are its outputs. An RC circuit comprising a resistor 120 and capacitor 122 set the received timing to DTMF tones, i.e., the delay before a tone is recognized by the transceiver. DTMF signals produced by the transceiver appear at the TONE output. A resistor 124 is the required pull down resistor for the output and the capacitor 126 filters internally generated noise from the TONE output. An isolation amplifier 128 sets the gain of the TONE output and removes its 2.5 volt DC component. The amplifier 128 includes a DC blocking capacitor 130 and resistors 132 and 134 to set the desired gain. The amplifier output is the dialer signal heretofore described.

The internal registers of the transceiver 96 may be read and written to directly by the computer 24 via the data bus 26 and data bus 32. Data transfers, which include the tones the transceiver is to detect, occur over four data lines D0-D3. The transceiver 96 is enabled for access whenever the CS line is asserted low. Actual transfer occurs when the O2 line is asserted high. The R/W input determines whether the registers are to be read or written to as derived from a control register bit via control circuit 34, rather than from the signal on the data bus 32, to improve timing. The RSO input determines which set of internal registers is to be accessed. The IRQ output, as previously mentioned, is an interrupt signal to the computer 24. An interrupt is generated in the computer 24 by the negative transition of the IRQ signal. For further description of how to configure a particular transceiver 96, such as the MITEL MT 8880, reference should be made to the manufacturer's specification sheet.

The call progress detector 102 such as a Silicon Systems SSI 980 detects the presence of audio energy in the call progress bands, i.e., dial tones, busy signals, and off hook "squeal."The detector can also be triggered by voice band signals. The capacitor 136 is provided to block the DC component of the received audio signal, and the resistor 138 coupled to a Vref biases the signal input to the proper DC level. The presence of call progress energy is signalled by a tone detect signal being asserted high. The tone detect signal is routed through the array 22 to the computer 24. Computer interrupts are generated by the positive and negative transitions of the tone detect signal.

An AGC amplifier 106 such as a LM 1818 provides automatic gain control and audio amplification to the received audio signal. The signal is passed through a resistor 140 that forms a voltage divider with an internal transistor at pin 5 of the amplifier 106 to set the proper voltage level. The audio signal continues through a DC blocking capacitor 142 and input resistor 144 to an internal amplifier. Gain is set by a feedback resistor 146. At the output of the internal amplifier, the audio signal splits between coupling capacitors 148 and 150. The signal through capacitor 148 passes into the amplifier 106 and determines the attenuation of the internal AGC transistor. The attack and decay times of the amplifier 106 are set by a capacitor 152 and a resistor 154 connected to the amplifier 106. A capacitor 156 is coupled to the internal transistor input for filtering high frequencies. For further description of how to configure an LM 1818 as amplifier 106, reference should be made to the manufacturer's specification sheet.

The audio signal that passes through capacitor 150 is routed as input to the PCM CODEC 108 such as a Motorola MC 145503. CODEC 108 is adapted to amplify and then convert the analog audio signal into pulse code modulated (PCM) data for storage on the data disk drive via the compression circuit 30. Additionally, the CODEC 108 is adapted to reconvert PCM data back into an analog audio signal to be transmitted as a previously recorded audio message. Resistors 158 and 160 are input and feedback resistors, respectively, and capacitor 162 filters high frequency noise which otherwise may cause aliasing inside the CODEC. The converted digital data appears serially as the TDD. A sample is converted at each rising edge of an 8 kHz clock on the TDE input. The serial digital data is clocked out of the converter by a 2.048 MHz clock signal on the TDC input. PCM data that is reconverted to an analog audio signal is read into the CODEC 108 at the RDD input from the disk drive via the compression circuit 30. The serial data is clocked in by the negative transitions of the 2.048 megahertz clock signal on the RDC input. The entry of the PCM data is begun by the 8 kHz clock signal of the RCE input. The reconverted analog signal is then transmitted through the R×O output to the 2-to-4 wire converter 94 as shown in FIG. 4.

The amplified audio signal appearing at the output end of the feedback resistor 160 is also applied to the audio detection circuit 104 for detection of audio energy. The amplified audio signal passes through a hot carrier low threshold rectifier 164 and a audio detector attack time resistor 166 to charge a capacitor 168. If the capacitor 168 charges to the threshold voltage set by a resistive network attached to an audio detect comparator 170, the comparator output goes low to signal detection of audio energy. Resistor 172 controls the discharge rate of capacitor 168 to provide a signal of sufficient duration. Hysteresis is supplied by resistor 174 to limit the frequency of audio detect occurrences. The audio detect signal is passed to the array 22 as a computer interrupt. The computer 24 is interrupted by the audio detect signal on its positive and negative transitions.

Figure 8:
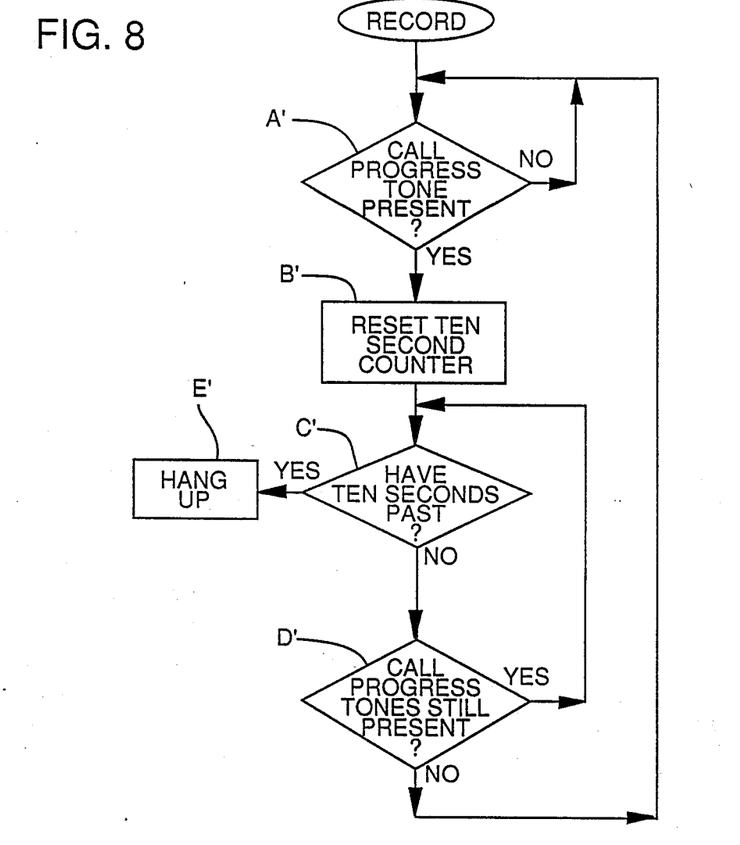
FIG. 8 is a flowchart of a method of detecting call progress tones to indicate the end of the message.

One function that transceiver 96, call progress detector 102, and audio detection circuit 104 provide is end of message detection so that the system 10 will hang up after a caller completes his message. Each circuit is controlled separately by the computer 24 to detect different evidence that a call has been terminated. For example, the transceiver 96 may be employed to detect a DTMF command that is generated by a caller to indicate a message is ended. The audio detection circuit 104 may be employed to detect a predetermined length of an audio silence to signal that a message is over. In some circumstances, however, call progress tones or noise produce enough audio energy that the system 10 continues to record even though the caller is no longer speaking. To improve end of message detection, the computer 24 is programmed to monitor call progress tones detected by the detector 102. The flowchart of FIG. 8 illustrates the computer's method. The system is in the record mode recording a message. Concurrently, the computer 24 is monitoring the interrupt generated by the detector 102 (step A'). If no call progress tone is present, the system continues to record. Once a progress tone is detected, however, an internal counter is set to a predetermined count, say 10 seconds (step B'). The progress tone is then monitored for the length of the count (steps C'D'). If the tone is 10 seconds in duration the computer 24 determines that the message is ended and directs interface 12 or simulator 16 to hang up (step E'). If, on the other hand, the tone disappears before 10 seconds pass, then the tone is determined to be a transient signal and is ignored. Recording then continues until a call progress tone of sufficient duration is detected or one of the other means for detecting the end of a message terminates the call.

Figure 9:
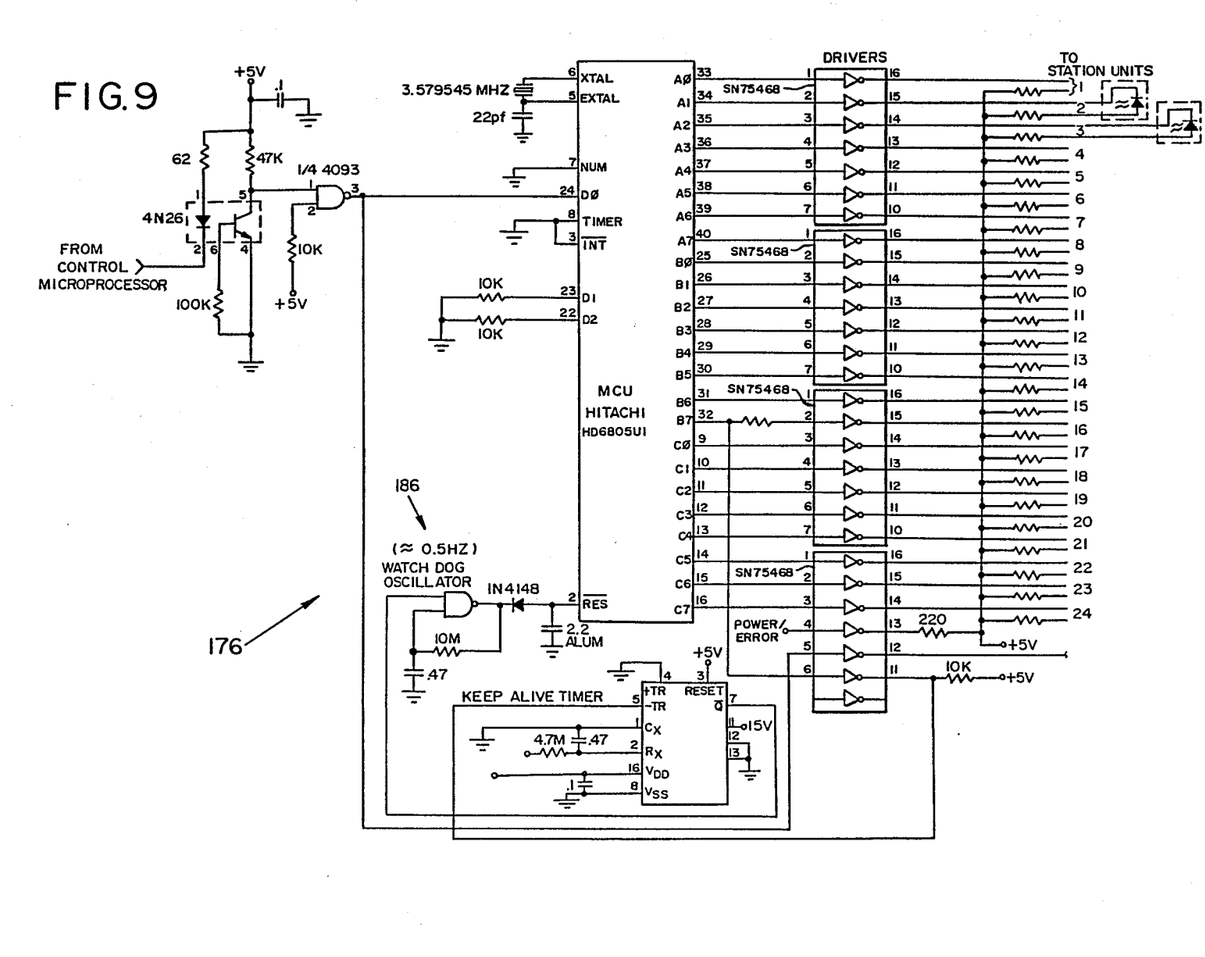
FIG. 9 is a schematic diagram of a message board circuit according to the invention.
Figure 10:
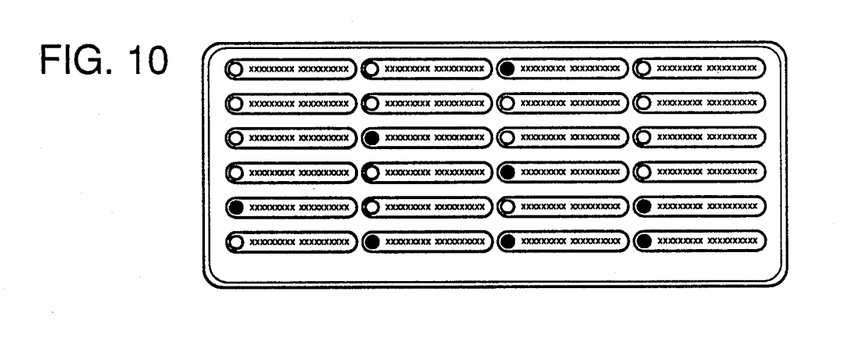
FIG. 10 is a perspective view of the message board.

As explained in U.S. Pat. No. 4,747,126 a voice mail system such as system 10 can include a message waiting indicator for indicating the status of the system and whether a user has a waiting message. Typically, these indicators include LEDs that are mounted to the user's telephone. For those users who are frequently out of the office, however, the LED is not visible and the message then may not be heard for quite some time. An alternative for notifying these persons is a message board 176 shown schematically in FIG. 9 and in perspective in FIG. 10. The board 176 contains a field of 24 red LED lights, one for each individual mailbox in the system. An amber in-use LED provides the system status information. Labels 178 for each user are provided. The board 176 is sized to be readily visible from a distance of 50 feet. Several boards 176 can be linked together to provide message notification throughout a company. The board can be installed at a message center near workbenches, lamps, etc., or centrally located wall. The operation of the components shown in FIG. 9 is amply described in U.S. Pat. No. 4,747,126 where the components are used for driving the individual LEDs located on the users' telephones.

For the system 10, the message board 176 is coupled to AUX ports 180 of the data bus interface 126 in FIG. 1. This connection allows the computer 24 to control over the message board 176.

Figure 11:
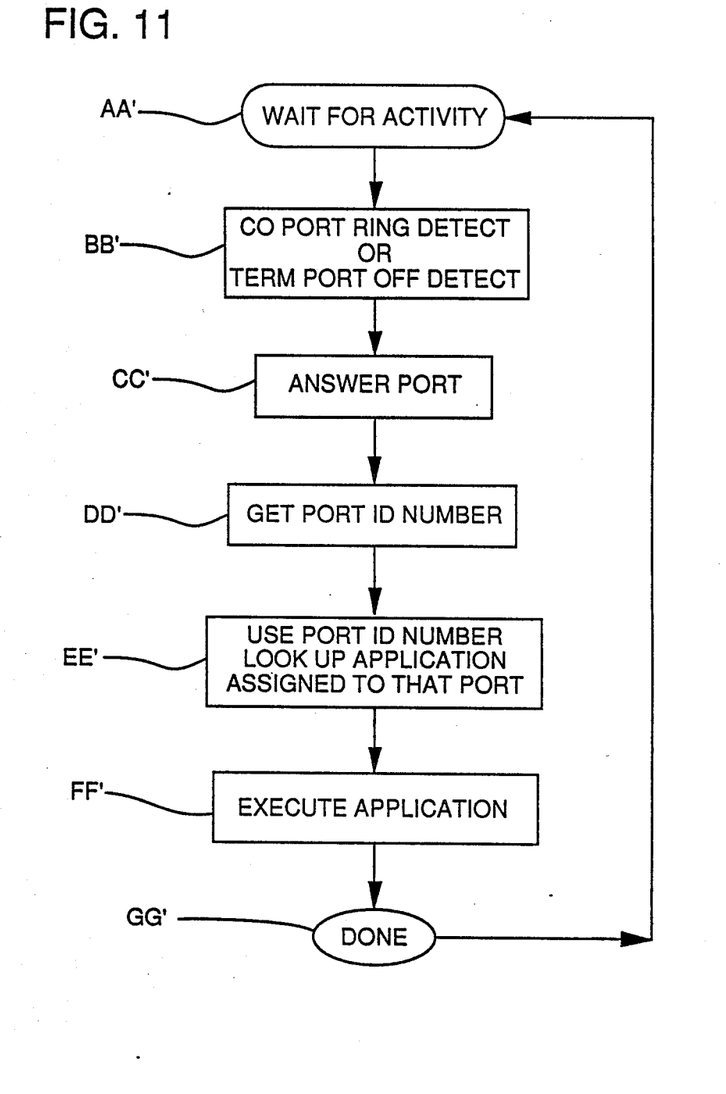
FIG. 11 is a flowchart of a method of assigning one of a number of system applications to incoming calls to the system.

The system 10 is not limited by its structure to only a voice mail system. Because of software control over the circuits therein, the system 10 may also be adapted for further applications such as providing specific information (weather, stock values, etc.) or as an auto attendant (answering incoming calls with a greeting and instructions to the caller for reaching a desired person or department in the company). In the present embodiment, the application is determined by the number called. FIG. 11 is a flowchart of the computer's method for determining the application. Initially, the computer waits for a call (step AA'). An incoming call is detected at the interface 12 or simulator 16 (step BB'). The computer responds by answering the call (step CC'). Each port of the interface 12 and simulator 16 has an identifying number which is read by the computer when it answers the port (step DD'). With this number as the address to look up table in memory, the computer determines the application assigned to the port (step EE'). The application, such as auto attendant, is then executed for that port (step FF') and the computer turns again to monitoring incoming calls (step GG'). As an alternative to dedicated ports for applications, the system 10 could be adapted to query the caller for the desired application and then assign that application to the caller's port.

Having illustrated and described the principles of the invention in a preferred embodiment, it should be apparent to those skilled in the art that the invention can be modified in arrangement and detail without departing from such principles. We claim all modifications coming within the spirit and scope of the following claims;

We claim:

1. In a voice mail system having a source for playing back a previously recorded audio message, apparatus for differentiating between a recorded DTMF signal recorded in the audio message and a user-generated DTMF signal, comprising:

a tone detector for detecting a tone in DTMF signals, the tone detector having mreans for generating an interrupt signal to indicate a tone's presence, the tone detector further including means for requiring a detected tone to persist for a predetermioned time before generating the interrupt signal to prevent transients from prompting the generation of said interrupt signal;

a switch coupled between the source of the recorded audio message and the tone detector; and computer means receiving a detected tone and responsive to the interrupt signal for determining if the DTMF signal producing the tone is a valid command, the computer means controlling the switch to interrupt transmission of the recorded audio message to the tone detector for a predetermined time, determining if the tone is still present during the predetermined time, and recognizing the tone as a valid command ifd still present and ignoring the tone as invalid if absent during the predetermined time.

* * * * *